United States Patent
He

(10) Patent No.: US 9,065,669 B2
(45) Date of Patent: Jun. 23, 2015

(54) METHOD AND APPARATUS FOR AUTHORIZING MULTICAST FORWARDING STATES

(75) Inventor: Haixiang He, Woburn, MA (US)

(73) Assignee: AVAYA INC., Basking Ridge, NJ (US)

( * ) Notice: Subject to any disclaimer, the term of this patent is extended or adjusted under 35 U.S.C. 154(b) by 1119 days.

(21) Appl. No.: 10/924,404

(22) Filed: Aug. 24, 2004

(65) Prior Publication Data

US 2006/0045085 A1    Mar. 2, 2006

(51) Int. Cl.

| | |
|---|---|
| *H04N 7/16* | (2011.01) |
| *H04L 12/28* | (2006.01) |
| *H04L 12/18* | (2006.01) |
| *H04L 29/06* | (2006.01) |

(52) U.S. Cl.
CPC .......... *H04L 12/2801* (2013.01); *H04L 12/185* (2013.01); *H04L 12/18* (2013.01); *H04L 63/08* (2013.01)

(58) Field of Classification Search
CPC ....... H04L 12/18; H04L 12/185; H04L 63/08; H04L 12/2801
USPC .............................. 370/390, 392, 395.31, 401
See application file for complete search history.

(56) References Cited

U.S. PATENT DOCUMENTS

| | | | | |
|---|---|---|---|---|
| 6,154,463 | A * | 11/2000 | Aggarwal et al. ............. | 370/408 |
| 6,240,464 | B1 * | 5/2001 | Fijolek et al. ................. | 709/250 |
| 6,563,830 | B1 * | 5/2003 | Gershon et al. .......... | 370/395.53 |
| 6,597,703 | B1 * | 7/2003 | Li et al. ......................... | 370/428 |
| 6,839,348 | B2 * | 1/2005 | Tang et al. ..................... | 370/390 |
| 6,847,638 | B1 * | 1/2005 | Wu et al. ........................ | 370/389 |
| 6,912,567 | B1 * | 6/2005 | Allard et al. ................... | 709/223 |
| 6,977,891 | B1 * | 12/2005 | Ranjan et al. .................. | 370/229 |
| 7,027,773 | B1 * | 4/2006 | McMillin ...................... | 455/41.2 |
| 7,046,680 | B1 * | 5/2006 | McDysan et al. ............. | 370/396 |
| 7,099,655 | B2 * | 8/2006 | Song et al. ..................... | 455/411 |
| 7,133,928 | B2 * | 11/2006 | McCanne ...................... | 709/238 |
| 7,221,660 | B1 * | 5/2007 | Simonson et al. ............. | 370/312 |
| 7,233,987 | B2 * | 6/2007 | Watkinson ..................... | 709/223 |
| 7,385,977 | B2 * | 6/2008 | Wu et al. ........................ | 370/389 |
| 7,969,980 | B1 * | 6/2011 | Florit et al. .................... | 370/390 |
| 2004/0158872 | A1 * | 8/2004 | Kobayashi ..................... | 725/120 |
| 2004/0208191 | A1 * | 10/2004 | Rajsic et al. ................... | 370/409 |
| 2005/0091304 | A1 * | 4/2005 | Trayler ........................... | 709/200 |
| 2005/0195817 | A1 * | 9/2005 | Chen et al. ..................... | 370/390 |
| 2006/0015928 | A1 * | 1/2006 | Setty et al. ..................... | 725/148 |
| 2010/0040056 | A1 * | 2/2010 | Kobayashi ..................... | 370/390 |
| 2011/0064078 | A1 * | 3/2011 | Jain et al. ....................... | 370/390 |

FOREIGN PATENT DOCUMENTS

WO    WO 2004/040860 A1 *    5/2004    ............. H04L 12/56

* cited by examiner

*Primary Examiner* — Jay P Patel
(74) *Attorney, Agent, or Firm* — Anderson Gorecki & Rouille LLP

(57) ABSTRACT

A method and apparatus for authorizing forwarding states in a Layer 2 device of a multicast system includes a forwarding table for use in forwarding communications to group members over interfaces of the Layer 2 device. According to one aspect of the invention, associated with the forwarding state is an authorization flag. The authorization flag signals whether or not the forwarding state is an authorized forwarding state over which multicast communications may be transferred. The Layer 2 device snoops authorization communications between a host and a layer 3 device, and updates the forwarding table authorization flags in response to these communications.

9 Claims, 4 Drawing Sheets

METHOD AND APPARATUS FOR AUTHORIZING MULTICAST FORWARDING STATES

FIELD OF THE INVENTION

This invention relates generally to the field of multicasting and more specifically to a method and apparatus for securing multicast transmissions by authentication.

BACKGROUND OF THE INVENTION

In many Internet Protocol (IP) network configurations, a host device may be coupled to a Layer 3 routing device (for accessing a Wide Area Network) through a Layer 2 (L2) switching device. An example of one such Layer 2/Layer 3 network is a Digital Subscriber Line (DSL) network, where multiple DSL customers are connected by a Digital Subscriber Access Multiplexer (DSLAM) at a phone company's central location links to a high-speed ATM line. The ATM line in turn may be coupled to a Layer 3 routing device, which serves to route the customers' requests for content to the appropriate location in the network. The router may provide IP data (such as Internet TV or the like) from an ISP to one or more of the connected customers. It is often common to use multicast transmissions to transmit content simultaneously from one source to multiple destinations. When performing multicast communications, a source transmits content to a Group Destination Address (GDA). Each device that is a member of the group associated with the GDA retrieves the data.

It is important to ensure that only authorized customers receive access to controlled content. Because group membership is constantly changing, it is often difficult to ensure that content is not mis-delivered.

SUMMARY OF THE INVENTION

According to one aspect of the invention, an apparatus for authorizing multicast forwarding states includes: a switch having a plurality of input interfaces and a plurality of output interfaces, the switch including a forwarding table including an entry for each one of the output interface. Each entry of the forwarding table includes a group and a flag, the group indicating a multicast group of which the apparatus desires to be a member and the flag indicating whether the apparatus is authorized to receive content for that group.

According to another aspect of the invention, a method for authorizing multicast forwarding states at a device includes the steps of snooping communications between a router and a host, the communications including communications associated with group membership of the host. The method includes the step of detecting, at the device, a communication associated with group membership of the host, the communication identifying a group in which the host desires to be a member and storing a forwarding state associated with the group in a forwarding table. The step of storing includes setting a flag corresponding to the forwarding state to indicate that the forwarding state is unauthorized and forwarding multicast communications to the host for the group in response to the flag.

According to another aspect of the invention, a multicast system includes a host device, a layer 2 device, coupled to the host device; and a layer 3 device, coupled to the layer 2 device, the layer 3 device including authorization logic, for authorizing membership in a multicast group. The host and the layer 3 device exchange communications regarding host group membership, wherein the communications include authorization communications. The layer 2 device includes a table for storing forwarding states for groups associated with the host, the forwarding state including an authorization flag indicating whether the host is authorized to receive communications for the group, the authorization flag set in response to the authorization communications.

DETAILED DESCRIPTION

A method and apparatus for authenticating multicast forwarding states in a Layer 2 device will now be shown and described. For the purposes of this application, a Layer 2 device is any device which forwards packets from an input interface to an output interface based on forwarding table contents. A forwarding state is a Source/Group Interface which is used at a Layer 2 device for forwarding communications from the Source to the Group.

Figure 1:
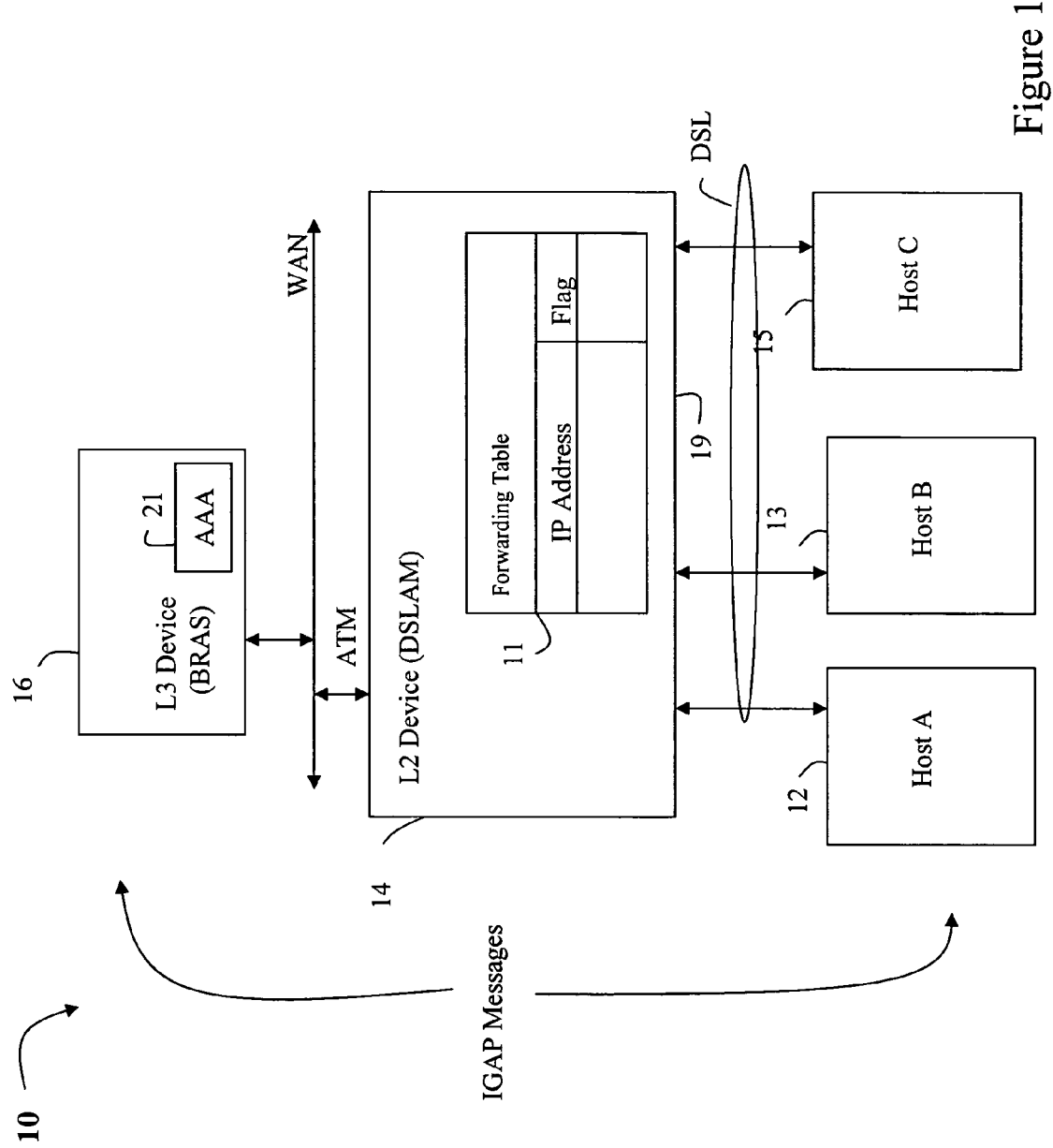
FIG. 1 is a block diagram of a network in which the present invention may be used.

FIG. 1 illustrates an exemplary embodiment of a network 10 in which the present invention may be used. The network 10 is shown to include a Host 12 coupled via a Digital Subscriber Line (DSL) to a Digital Subscriber Line Access Multiplexer (DSLAM) 14. The Host 12 may be, for example, a Personal Computer (PC). The DSLAM 14 is a mechanism at a phone company's central location that links many customer DSL connections to a single high-speed Asynchronous Transfer Mode (ATM) line. When the phone company receives a DSL signal, an ADSL modem with a Plain Old Telephone Service (POTS) splitter (not shown) detects voice calls and data. Voice calls are sent to the Public Switched Telephone Network (PSTN), and data are sent to the DSLAM. Data from the DSLAM is passed through the ATM to the WAN (or Internet), then back through the DSLAM and ADSL modem before returning to the customer's PC.

A Layer 3 device 16 is shown coupled to the WAN. For the purposes of the present invention, a Layer 3 device is any device that provides processes packets, for forwarding or the like, for example for routing, authentication or accounting. In the embodiment of FIG. 1 the Layer 3 device is a router implementing a Broadband Remote Access Service (B-RAS) 16. As will be described in more detail below, the RAS either includes or is coupled to an Authentication, Authorization and Accounting logic (AAA) 21. The AAA 21 is a system which controls what computer resources users have access to and to keeps track of the activity of users over a network.

According to one aspect of the invention, the network 10 includes logic for implementing the Internet Group Management Protocol (IGMP). IGMP is used to dynamically register individual hosts in a multicast group on a particular Local Area Network (LAN). Hosts identify group memberships by sending IGMP messages to their local multicast router. Under IGMP, routers listen to IGMP messages and periodically send out queries to discover which groups are active or inactive on a particular subnet. IGMPv1 is described in Internet Engineering Task Force (IETF) Request For Comments (RFC) 1112. Hosts, such as Host 12, send out IGMP membership reports corresponding to a particular multicast group to indicate that they are interested in joining that group. The router 16 periodically sends out an IGMP membership query to verify that at least one host on the subnet is still interested in receiving traffic directed to that group. In IGMPv1, when there is no reply to three consecutive IGMP membership queries, the router times out the group and stops forwarding traffic directed toward that group. IGMPv2 is described in IETF RFC 2236, and is similar to IGMPv1, with the exception that an explicit 'Leave Group' message is provided.

As shown in FIG. 1, the L2 device 14 includes a forwarding table. In general IGMP forwarding tables store forwarding state; i.e., one or more group identifiers for each output interface of the switch, the group identifiers indicating the multicast groups that are transferred over the corresponding interface. As will be described in more detail below, according to one aspect of the invention, the forwarding state includes an authorization flag 23. The authorization flag selectively enables use of the forwarding state. That is, packets are not forwarded to any S/G pair until the forwarding state has been authenticated.

In one embodiment the forwarding state in the L2 device is populated using IGMP snooping techniques. During IGMP snooping, the L2 switch to examines, or snoops, Layer 3 information in the IGMP packets sent between the hosts and the router. When the switch hears the IGMP host report from a host for a particular multicast group, the switch adds the host's port number to the associated multicast table entry. When the switch hears the IGMP leave group message from a host, it removes the host's port from the table entry. Because IGMP control messages are transmitted as multicast packets, they are indistinguishable from multicast data at Layer 2. A switch running IGMP snooping examine every multicast data packet to check whether it contains any pertinent IGMP must control information.

Figure 2:
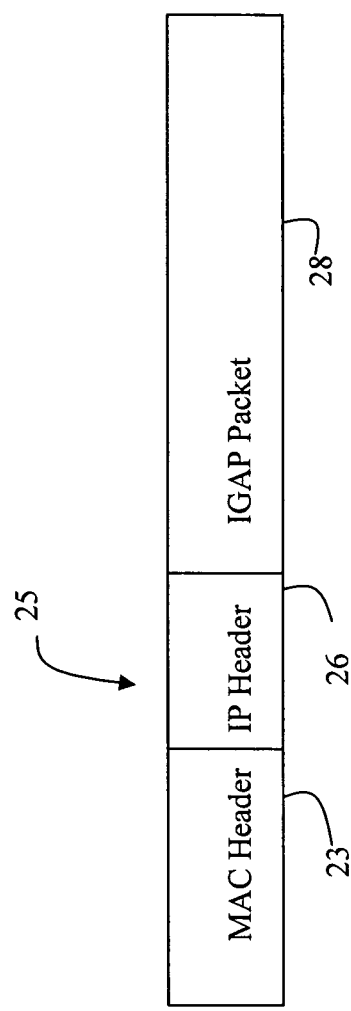
FIG. 2 is a diagram provided to illustrate a basic structure of an Internet Group Management Protocol with Authentication (IGAP) packet.

According to one aspect of the invention, the IGMP snooping process is augmented to include snooping of Authentication information for forwarding states in systems which use the IGMP with Authentication Protocol (IGAP). IGAP is a variant of IGMPv2 that adds user authentication information (such as an Authorization Header) to IGMP packets. An example of an IGAP packet 25 is shown in FIG. 2 to include a Media Access Control (MAC) header, an Internet Protocol (IP) header and an IGAP Header and payload. The use of the IGAP protocol thus enables an IP multicast service provider to authenticate requests to join a specific multicast group based on user information. The use of authentication information ensures that content is forwarded only to authorized multicast groups.

Figure 3:
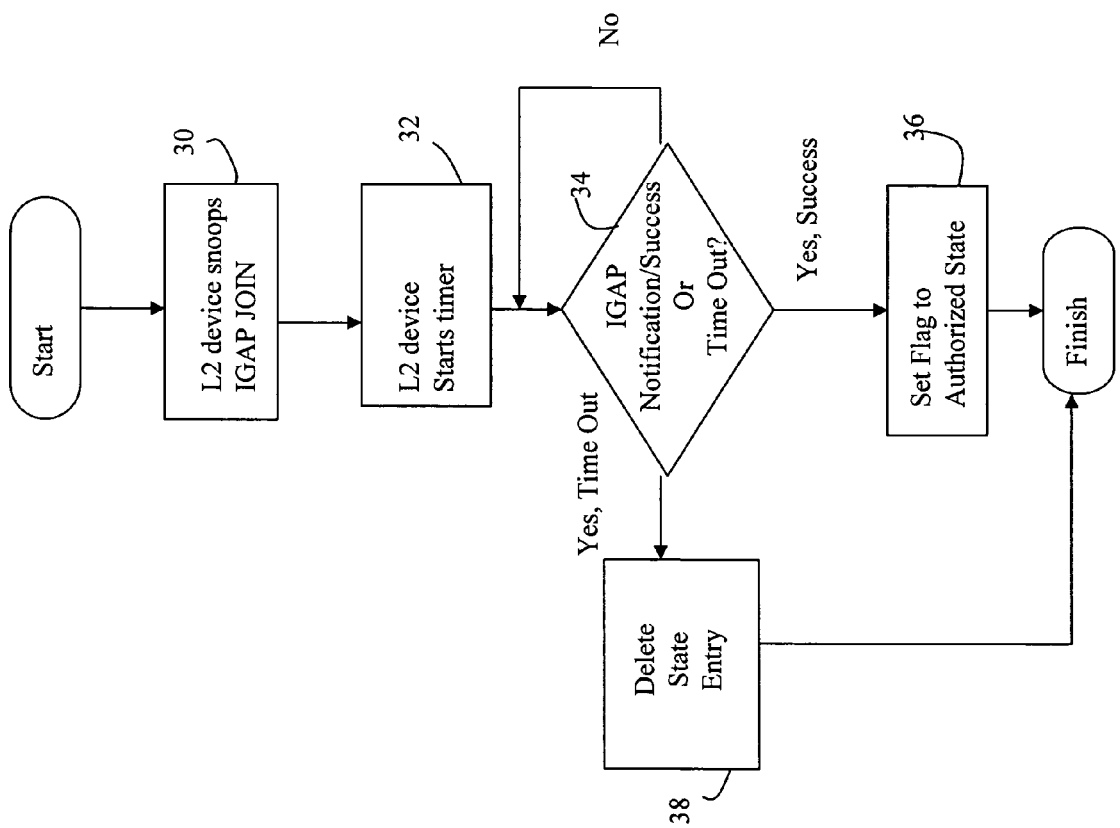
FIG. 3 is a flow diagram provided to illustrate several steps that may be performed to authorize a forwarding state in a L2 device according to the present invention.

Referring now to FIG. 3 a flow diagram is provided for illustrating several exemplary steps that may be taken to maintain authorization flags in a forwarding table of an L2 device. At step 30, the L2 device Snoops communications that occur between the L3 device and the Host. The communications may include, for example, IGAP Join messages, where the Host seeks to join a group, IGAP Report messages, where the Host reports group membership, etc. Snooping is performed at the L2 device by parsing packets as they are forwarded through the switch from the Host to the L3 device to identify IGAP command packets. At step 30, the L2 device detects an IGAP command message. Upon detection of an IGAP Join message, the L2 device generates a forwarding state entry for the Source/Group pair indicated in the Join message, and writes it into the forwarding table. It also sets a flag, corresponding to the state to 'Unauthorized.' Multicast messages will not be forwarded to the Source/Group pair unti the state is authorized.

At step 32, the L2 device sets a timer associated with the Source/Group pair entered in the forwarding table. According to the IGAP standard, if the L3 device authorizes the Source/Group pair, and the Source/Group pair is eligible to receive multicast data, the L3 device will forward a Success Notification to the Host within a predetermined time window. Thus, at step 34 the L2 device continues to snoop communications between the Host and the L3 device until either a Notification of Success is received, or the time period expires. If at step 34 it is determined that the time period expires, or a IGAP Notification of Failure is received, then at step 38 the multicast forwarding state associated with the time out or failure is removed from the forwarding table. The multicast forwarding state in the forwarding table is not authorized, and no transmission will be made to the host for this group. Otherwise, if at step 34 an indication of Success was received, then at step 36 the authorization flag in the L2 device is set to Authorized. Subsequent transmissions for the group will be made to the Host over the interface indicated in the forwarding table.

Figure 4:
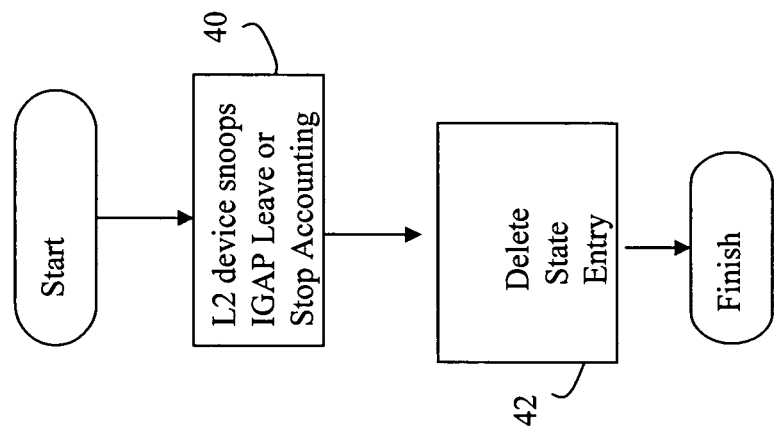
FIG. 4 is a flow diagram provided to illustrate several steps that may be performed to remove a forwarding state from a forwarding table in the event that a coupled host leaves a group or the group is otherwise terminated.

Referring now to FIG. 4, a flow diagram of an exemplary process that is used to maintain forwarding states in the event of group membership termination is shown. At step 40, the L2 device snoops a IGAP Leave message from the host, indicating that the host wishes to leave the group, or alternatively an Accounting Stop message from the L3 device, indicating that the group membership is terminated for accounting reasons. When either of these messages are received at the L2 device, the L2 device deletes the corresponding forwarding state entry from the state table, thereby terminating multicast transmissions to the host.

Accordingly, a method and apparatus for authorizing forwarding states at a L2 device has been shown and described. With such an arrangement, the security of a multicast group transmission is increased, as the delays associated with the Host/L3 communication are removed. The L2 device, by snooping the communications between the Host and L3 device knows that a host has been authorized to receive messages before that communication reaches the host, and can therefore increase the speed by which the newly joined host receives authorizes communication. In addition, by monitoring the IGAP Leaves, the L2 device can stop multicast transmissions to unauthorized devices before the transmissions are terminated at the source. Such an arrangement increases the overall security of the system by reducing the number of packets that are sent to unauthorized members of a group one their membership has been terminated.

The above description and figures have included various process steps and components that are illustrative of operations that are performed by the present invention. However, although certain components and steps have been described, it is understood that the descriptions are representative only, other functional delineations or additional steps and components can be added by one of skill in the art, and thus the present invention should not be limited to the specific embodiments disclosed. In addition it is understood that the various representational elements may be implemented in hardware, software or a combination thereof.

While the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

The invention claimed is:

1. An apparatus comprising:
   a Layer 3 device;
   a plurality of host devices; and
   a Layer 2 switch which processes packets sent from the Layer 3 device to the host devices, the Layer 2 switch functioning to:
      examine Layer 3 information in the packets to identify changes in multicast group membership of the hosts;
      update a data record indicative of multicast group membership by:
         adding a first host to a first multicast group in response to a report or join message indicative of membership of the first host in the first multicast group; and
         deleting the first host from the first multicast group if a corresponding success notification is not received within a predetermined time following the report or join message, or in response to a corresponding leave or accounting stop notification message, prevent a first multicast group packet addressed to the first host device from being forwarded to the first host device if the data record indicates that the first host device is not a member of the first multicast group; and
      forward the first multicast group packet addressed to the first host device to the first host device if the data record indicates that the first host device is a member of the first multicast group.

2. The apparatus of claim 1 wherein the Layer 3 information in the packets includes Internet Group Management with Authentication (IGAP) commands.

3. A method comprising the steps of:
   in a network including a Layer 3 device, a plurality of host devices, and a Layer 2 switch,
   in the Layer 2 switch, processing packets sent from the Layer 3 device to the host devices, including:
      examining Layer 3 information in the packets to identify changes in multicast group membership of the hosts;
      updating a data record indicative of multicast group membership by:
         adding a first host to a first multicast group in response to a report or join message indicative of membership of the first host in the first multicast group; and
         deleting the first host from the first multicast group if a corresponding success notification is not received within a predetermined time following the report or join message, or in response to a corresponding leave or accounting stop notification message;
      preventing a first multicast group packet addressed to the first host device from being forwarded to the first host device if the data record indicates that the first host device is not a member of the first multicast group; and
      forwarding the first multicast group packet addressed to the first host device to the first host device if the data record indicates that the first host device is a member of the first multicast group.

4. The method of claim 3 including the step of
   monitoring communications between the Layer 3 device and the first host to detect authorization of a forwarding state, including setting a flag corresponding to the forwarding state to indicate that the forwarding state is authorized in response to detection of a communication between the Layer 3 device and the first host indicating such authorization.

5. The method of claim 4 including the step of unsetting the flag to indicate that the forwarding state is not authorized in response to a group termination message exchanged between the Layer 3 device and the first host.

6. The method of claim 5 including examining Internet Group Management and Authorization Protocol (IGAP) information in the packets to identify changes in multicast group membership of the hosts.

7. The method of claim 6 including examining an IGAP Join.

8. The method of claim 6 including examining an IGAP Leave message issued by the first host.

9. The method of claim 6 including examining an Accounting Stop Notification issued by the Layer 3 device.

* * * * *